June 14, 1960 C. J. CHEBUHAR 2,940,581
MAGNETIC CAN BODY CONVEYING AND TURNING MECHANISM
Filed Jan. 23, 1958 6 Sheets-Sheet 5

INVENTOR
Charles J. Chebuhar.
BY
Mason, Porter, Diller & Stewart
ATTORNEYS

June 14, 1960 C. J. CHEBUHAR 2,940,581
MAGNETIC CAN BODY CONVEYING AND TURNING MECHANISM
Filed Jan. 23, 1958 6 Sheets-Sheet 6

INVENTOR
*Charles J. Chebuhar.*

BY
*Mason, Porter, Diller & Stewart*
ATTORNEYS

United States Patent Office 2,940,581
Patented June 14, 1960

2,940,581

MAGNETIC CAN BODY CONVEYING AND TURNING MECHANISM

Charles J. Chebuhar, Chicago, Ill., assignor to Continental Can Company, Inc., New York, N.Y., a corporation of New York Filed Jan. 23, 1958, Ser. No. 710,704

10 Claims. (Cl. 198—33)

The present invention relates to a novel mechanism for receiving can bodies from a side seaming machine in longitudinally, equally spaced relationship, turning the bodies 90° and elevating them to a desired height for gravitational rolling feed to the machine performing the next operation. While the invention has been specifically designed to be used for handling double-length can bodies, it is equally well adapted to be used for handling standard length can bodies or can bodies of various lengths, either shorter or longer than standard length bodies.

Present can turning and elevating devices operate successfully with single length can bodies but are not satisfactory for handling double length can bodies. Single length can bodies when conveyed by conventional can turning and elevating machines are delivered in longitudinal, equally spaced relationship from the side seaming machine and are rotated 90° by means of a fixed finger that projects out far enough into the path of the procession of cans so as to engage the leading end of each can wall at one side only of the can body axis. This creates a turning moment, due to the weight and velocity of the can body causing it to revolve in a horizontal plane around the finger. Upon completion of a 90° turn, the can bodies swing free of the finger and are immediately engaged by side guides that prevent further rotation in a horizontal plane and the can bodies at the same time gravitate down an inclined chute in rolling manner, whereupon they are engaged between a pair of endless belts that co-act to lift the can bodies to the desired elevation for gravitational feed to the next operation.

It has been found by experience that when double length can bodies strike the projecting finger, are turned 90°, and then engaged by the chute guides, that there is more of a tendency to jam up in the chute guides than with single length can bodies. This tendency is caused by the more erratic manner in which the double length can bodies are turned by the finger due to their increased weight, and length, about double the weight and length of single length can bodies, while the diameter remains unchanged. This causes the turning force exerted by the can bodies due to their velocity and weight to increase approximately double, while the moment arm, the distance from the longitudinal axis of the bodies to the side wall, remains unchanged. This moment arm in relation to the increased length and weight of the can bodies has a tendency to cause the can bodies to bounce back off the turning finger rather than rotating smoothly around it. This tendency to erratic turning behavior in conjunction with the greater length to diameter ratio of the double length can bodies gives rise to difficulties in orienting the bodies to roll down the chute immediately following the turning finger. The chute has side guides that ordinarily straighten out any can bodies that may have turned a slightly greater or lesser amount than the desired 90° in coming off the turning finger. The guides operate very well with single length bodies as the weight of the bodies is slight and hence there is less inertia to overcome. Also, their ratio of length to diameter is small and this results in less tendency for the bodies to cock or chatter in the guides as they are being oriented to roll down the chute. Double length can bodies have considerably more inertia to overcome in making any corrections by the guides and thus a greater cocking force exists which, in conjunction with the greater length to diameter ratio, can cause serious cocking or chattering in the guides, resulting in jamming up of can bodies particularly when a can body slow in becoming oriented in the roll chute is struck by the following can body coming off the rotating finger.

The present invention has aimed to provide a novel mechanism which eliminates the prior turning finger and overcomes the above enumerated problems and at the same time positively orients the side seams of the can bodies so that further operations on said seams may be performed while the can bodies are being turned and elevated. An example of such further operations is the effective application of heat to dry the inside and outside lacquer stripes applied to the seams by the side seaming machine.

In carrying out the above stated end, a further object has been to provide a novel mechanism in which one, the seamed can bodies from the seaming machine are progressively fed in equally spaced longitudinally aligned relation along a feedway; two, a can body transfer chain is mounted at the delivery end of the feedway and is provided with magnetic can body receivers to successively pick off the advanced can bodies and elevate them to an overhead chute down which they are to roll by gravity; three, the can body receivers are smoothly turned ninety degrees while the can bodies are being elevated; and four, the elevated and turned can bodies are smoothly stripped from the magnetic receivers and gently transferred to said chute.

Another object has been to spring-bias the chain-carried can body receivers to normal body receiving position and to provide smoothly operating actuating means for turning said receivers as required, said actuating means comprising a vertical cam track substantially unidirectional with the can body elevating reach of the transfer chain, and cam followers connected with said can body receivers and cooperable with said cam track.

Yet another object has been to provide fixed magnetic means to hold each can body horizontally positioned on the feedway as it is initially presented by the feed means to the can body receiving reach of the transfer chain, thereby preventing tilting of the can body under the influence of the approaching can body receiver; and to provide a fixed cam beyond said fixed magnetic means in position to guide each magnetically held can body away from said fixed magnetic means as this can body is further advanced by the feed means, the can body by that time being in proper engagement with the receiver.

Another object has been to provide a novel association of stripper means and transfer turret for removing the elevated can bodies from the can body receivers and transferring them to the chute down which they are to roll.

A further object has been to insure that the turned can bodies shall project equidistantly from the elevating chain, to insure that the transfer turret can deliver them, without jamming, into the chute down which they are to roll.

A still further object has been to provide a novel construction in which a single sprocket chain carries the can body receivers and their cam followers, and in which the mounting and driving sprockets for said chain are notched to clear said cam followers.

Yet another object has been to provide novel and advantageous construction for the magnetic can body receivers.

With the above and other objects in view that will hereinafter appear, the nature of the invention will be more clearly understood by reference to the following detailed description, the appended claims and the several views illustrated in the accompanying drawings.

In the drawings:

Figure 4 is an elevation of the upper end of the machine, as indicated by the arrow 4 of Figure 1a.

Figure 5 is a detail elevation, partly in section, showing the cam track and the cam followers for turning the can body receivers as they ascend.

Figure 6 is an enlarged view similar to the upper end of Figure 1a.

Figure 7 is a horizontal view on line 7—7 of Figure 1.

The construction shown in the drawings may be considered as preferred and will be rather specifically described. However, attention is invited to the possibility of making variations within the scope of the invention.

Figure 1:
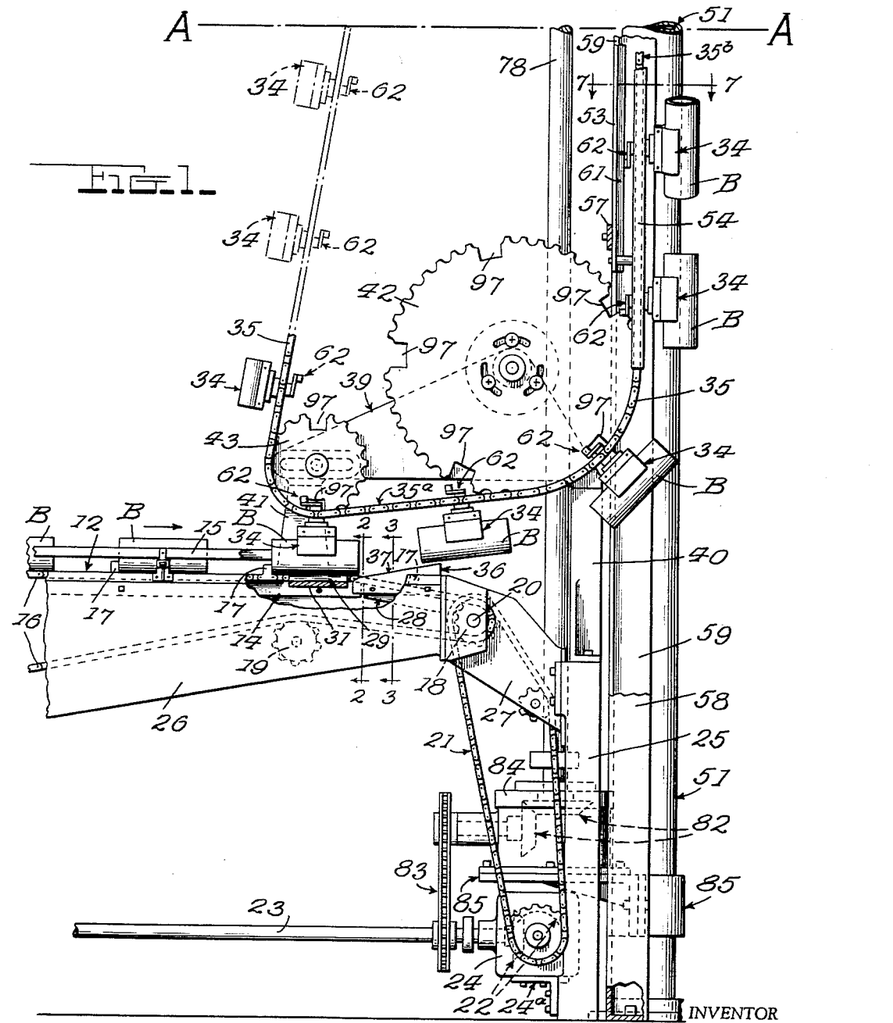
Figures 1 and 1a jointly disclose a side elevation, partly broken away and in section, when the lines A—A and B—B are matched.
Figure 2:
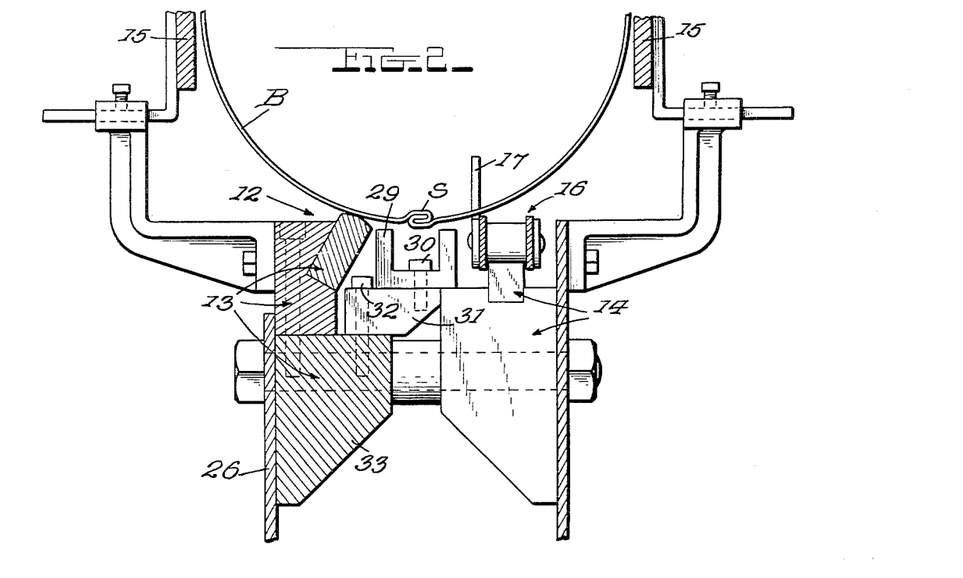
Figure 2 is an enlarged transverse sectional view on line 2—2 of Figure 1, showing the can body feedway and the fixed magnet which prevents premature movement of the can bodies under the influence of the magnets of the chain-carried can body receivers.
Figure 3:
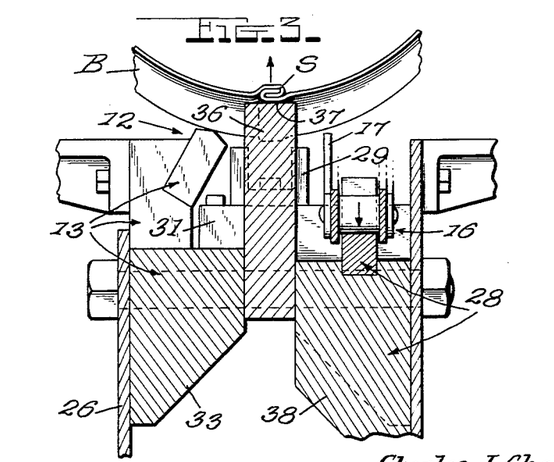
Figure 3 is a similar view on line 3—3 of Figure 1, showing a can body engaged with the cam which upwardly guides the can bodies as they are fed from the field of influence of the fixed magnet.

As seen in Figures 1 to 3, a horizontal feedway 12 extends from the side seaming machine and is provided with a sectional can body supporting rail 13 with a sectional feed chain supporting rail 14, and with can body guides 15. A feed chain 16 rests on the rail 14 and coacts with the rail 13 in supporting the can bodies B with their completed side seams S presented downwardly; and said feed chain has feed lugs 17 for feeding the bodies B along the feedway in aligned equally spaced relation.

The chain 16 is trained around suitably positioned sprockets, one of which is shown at 18 in Figure 1. The second sprocket 19, also shown in this view, is simply a chain guiding idler. The sprocket 18 is secured to a cross shaft 20 mounted at the delivery end of the feedway 12. This shaft 20 is driven by means of a chain and sprocket drive 21 and a bevel gear set 22 from a main drive shaft 23 which is driven by part of the side seaming machine. The gear set 22 is shown as including a casing 24 which is bracket-mounted at 24a on a leg frame 25 on which the delivery end of the feedway frame 26 is also bracket-mounted at 27.

The terminal portion 28 of the rail 14 declines to the sprocket 18 to give the feed chain a similar declination in this region, for the purpose of disengaging its lugs 17 from the can bodies B when these bodies have been engaged with the body transfer chain hereinafter described.

Near the receiving end of the declined terminal portion 28, a permanent magnet 29 is secured in the feedway 12 between the rails 13 and 14 in position to underlie the can bodies B. This magnet 29 is horizontally elongated and is shown (see Figure 2) as secured at 30 upon a mounting block 31 which is secured at 32 to the lower section 33 of the rail 13.

The purpose of the magnet 29 is to hold the can bodies B against upward tilting under the influence of the magnets of the can body receivers 34 (later described) as said can bodies are initially presented to the can body receiving reach of the transfer chain 35, thereby preventing improper engagement of the can bodies with the receivers.

Beyond the magnet 29, a horizontally elongated cam 36 is secured in the delivery end portion of the feedway 12; and the upper edge 37 of said cam 36 inclines away from the portion of the feed chain 16 travelling on the declined rail terminal 28. The cam 36 is shown in Figure 3 as secured between the lower section 38 of this rail terminal 28 and the lower section 33 of the rail 13.

The purpose of the cam 36 is to positively guide each can body B upwardly toward the receiving reach of the transfer chain 35 as said body is advanced by the feed chain lug 17 out of the zone of influence of the magnet 29, thus preventing this magnet from interfering with proper seating of the can body in the receiver 34.

Over the delivery end portion of the feedway 12, a sprocket mounting support 39 (Figure 1) is provided, said support being fixedly mounted on leg brackets 40 and 41 secured respectively to the leg frame 25 and the feedway frame 26. Upon the support 39, a large sprocket 42 and a smaller sprocket 43 are mounted. These sprockets are in the same vertical plane with the axes of the can bodies B on the feedway 12 and they are engaged by the lower portion of the transfer chain 35. The chain 35 is also trained around an elevated sprocket 44 (Figures 1a, 4, 6 and 8) which is disposed over the sprocket 42: and this chain is provided with a lower, somewhat inclined, can body receiving reach 35a substantially parallel with and spaced upwardly from the cam edge 37, and with a can body elevating reach 35b.

The sprocket 44 is secured to a shaft 45 mounted in bearings 46 on a bracket 47. This bracket includes a downwardly projecting mounting portion 48 secured at 49 (Figures 6 and 8) to a collar 50 which is clamped around a fixed vertical post 51 extending from the machine bed, or the floor to the ceiling or other overhead part of the plant in which the machine is installed.

Figures 4, 5:
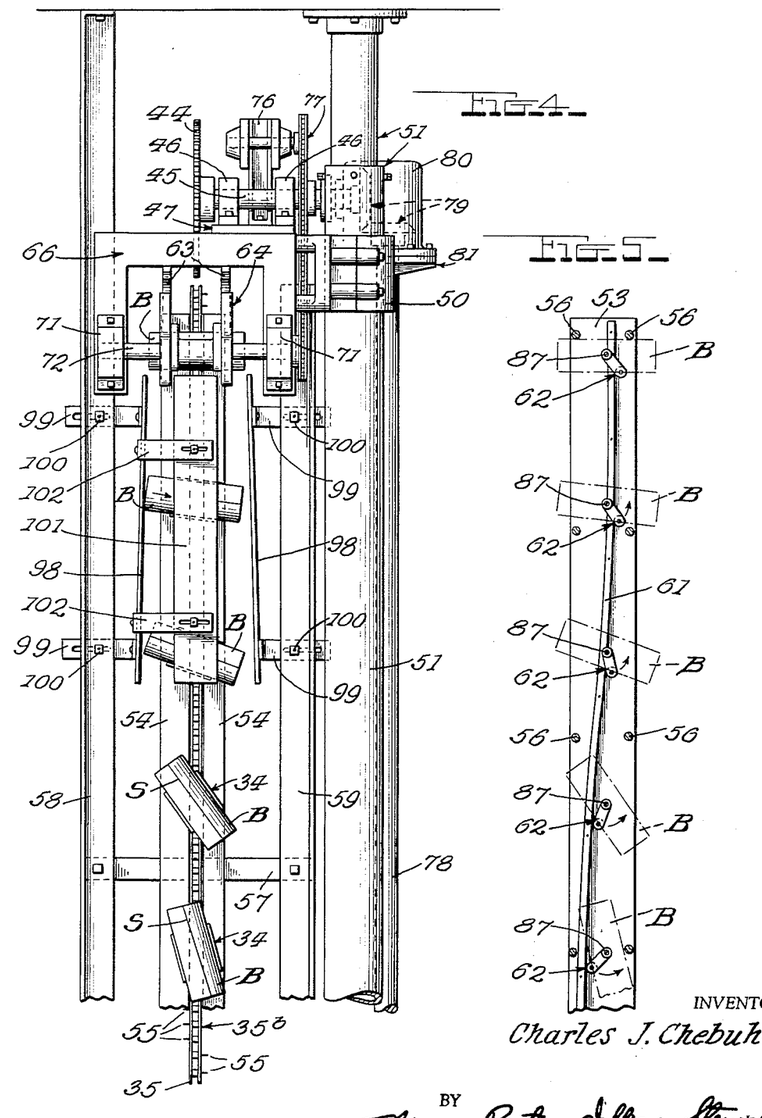
Figures 6, 7:
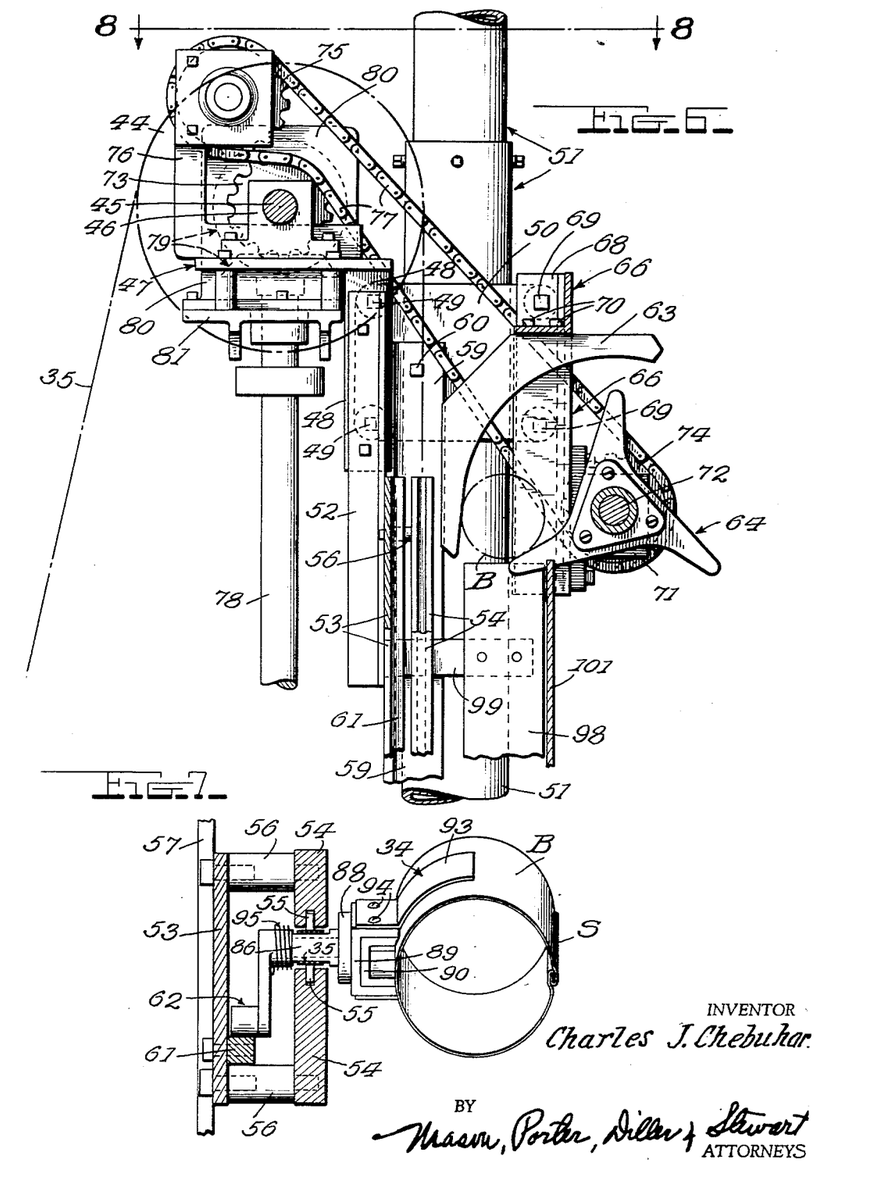
Figures 8, 9, 10:
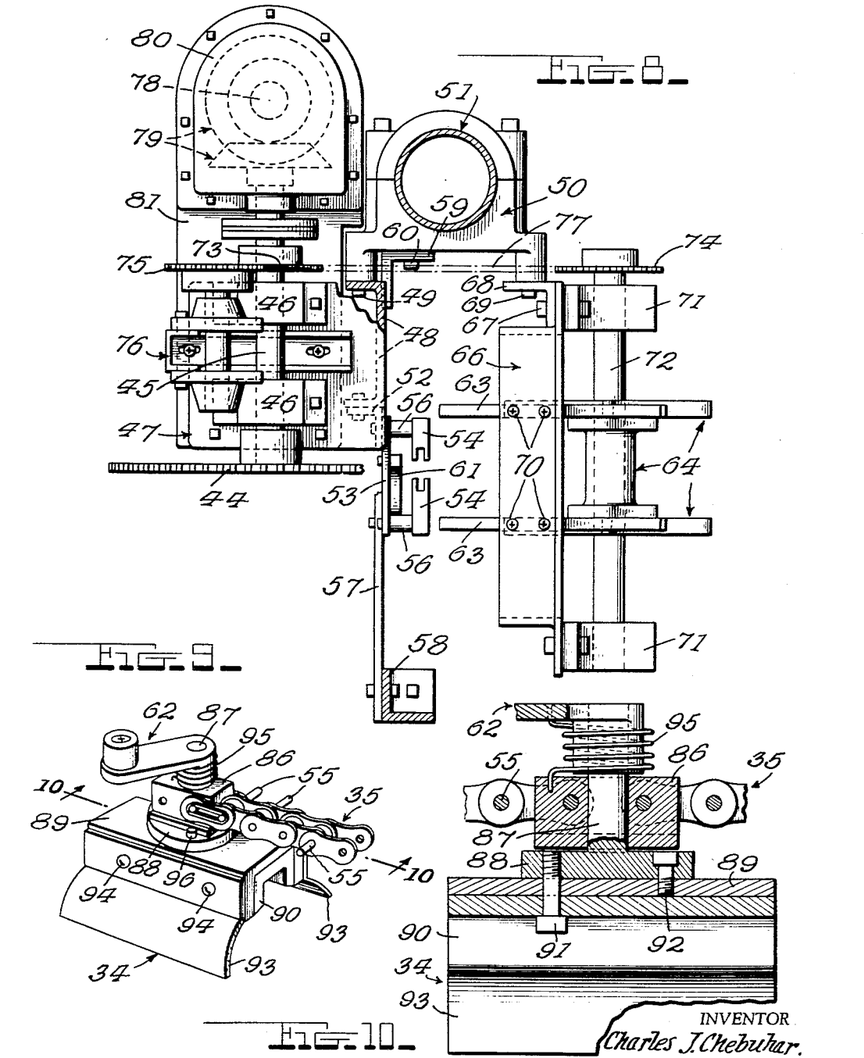
Figure 8 is an upper end view, partly in section, on line 8—8 of Figure 6.
Figure 9 is a perspective view of a portion of the transfer chain and one of the can body receivers thereof.
Figure 10 is an enlarged longitudinal sectional view as indicated by line 10—10 of Figure 9.

A vertical angle bar 52 (Figures 1a, 6 and 8) is secured to and projects downwardly from the mounting portion 48 of the bracket 47: and the upper end of a vertically elongated plate 53 is secured to said angle bar 52. This plate is parallel with the reach 35b of the chain 35 and carries channeled guide tracks 54 for said reach. At least some of the chain link pivots 55 project laterally from the chain as seen in Figures 4, 7 and 9 and are received in the channels of the guide tracks. The plate 53 is spaced from the sprocket side of the chain 35: and the tracks 54 are mounted on said plate by means of spacers 56. The lower and intermediate portions of the plate 53 are secured to vertically spaced transverse bars 57 (Figures 1, 1a, 4, 7 and 8). To fixedly mount these bars 57, two fixed vertical angle bars 58 and 59 are provided. The bar 58 may well extend from floor to ceiling of the plant. The bar 59 may extend from the floor to the collar 50 and be secured at 60 (Figures 7 and 8) to this collar.

A vertically elongated cam track 61 (Figures 1, 1a, 5, 6, 7 and 8) is secured to the plate 53 and is cooperable with cranked cam followers 62 with which the can body receivers 34 are provided, to turn said receivers 90° as they elevate the can bodies B, as best seen in Figures 4 and 5.

Fixed arcuate strippers 63 (Figures 1a, 6 and 8) are provided to strip the elevated can bodies from the magnetic receivers 34: and a transfer turret 64 coacts with said strippers 63 to gently guide the stripped off cans into the chute 65 (Figure 1a) down which they are to roll.

An arched frame 66 (Figures 1a, 4, 6 and 8) is provided for mounting the strippers 63 and the turret 64. The frame 66 is secured at 67 (Figure 8) to an angle bar 68 (Figures 6 and 8) and this bar is secured at 69 to the collar 50. The strippers 63 are secured at 70 to the crown of the frame 66: and the legs of this frame carry bearings 71 for the shaft 72 of the turret 64.

Figure 1A:
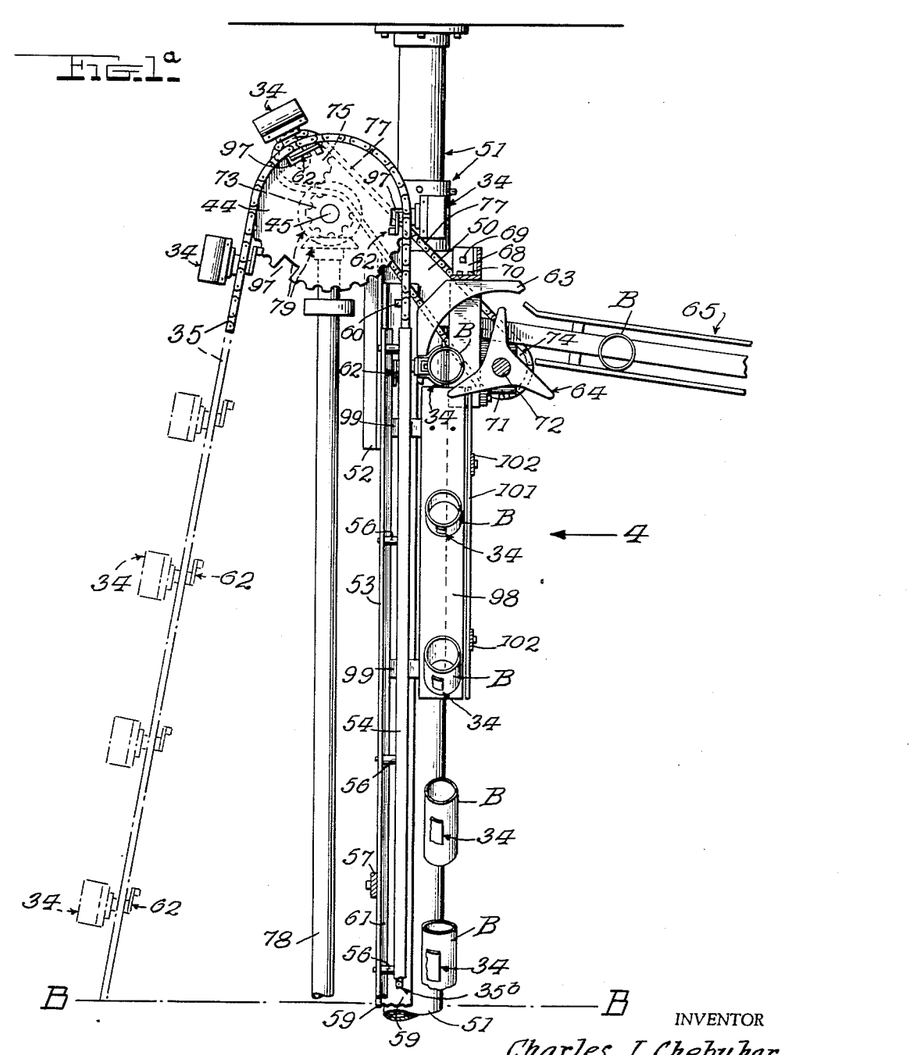

The turret shaft 72 is chain and sprocket connected to the shaft 45 of the uppermost sprocket 44 as best seen in Figures 1a, 6 and 8. To accomplish this, one sprocket 73 is secured to the shaft 45, a second sprocket 74 is secured to the shaft 72, an idler sprocket 75 is mounted on a bracket 76 near the sprocket 73, and a chain 77 is trained around the two sprockets 74 and 75 with its lower reach engaging the top of the sprocket 73.

A vertical drive shaft 78 (Figures 1, 1a, 6 and 8) is provided for the shaft 45. The upper end of the shaft 78 is connected with the shaft 45 by means of a bevel gear set 79 in a casing 80 carried by a bracket 81 suitably secured under the bracket 47. The lower end of the shaft 78 (Figure 1) is connected by a bevel gear set 82 and a chain and sprocket connection 83 with the main drive shaft 23. The gear set 82 is disposed in a casing 84 mounted on a bracket 85 secured to the post 51.

The main drive shaft 23, due to connections above described, drives the feed chain 16, the uppermost sprocket 44 for the transfer chain 35, and the transfer turret 64.

The construction of the transfer chain 35 and its can body receivers, is best seen in Figures 7, 9 and 10. The chain is of roller type and includes bearing blocks 86 which constitute links of the chain. These bearing blocks are spaced apart in conformity with the spacing of the can bodies B fed along the feedway 12. A short shaft 87 is mounted in each bearing block 86 and extends from the sprocket side of the chain 35 to the outer side of the latter. The inner end of the shaft 87 has the cam follower 62 secured thereto: and the outer end of said shaft is provided with a flange 88. An elongated channeled head 89 lies against the flange 88 and contains a permanent magnet 90. A screw 91 extends through the magnet 90 and head 89 and secures both to the flange 88. Another screw 92 further secures the head 89 to the flange 88. Two side wings 93 are secured at 94 to the opposite longitudinal sides of the head 89 and project curvedly beyond the channeled side of said head in conformity with the circumferential curvature of the can bodies B.

A helical spring 95 surrounds the inner end of the cam follower 62 and serves to normally bias the receiver 34 to a normal can body receiving position in which one end portion of the bearing block 86 abuts a stop 96 on the flange 88 (Figure 9).

All of the sprockets 42, 43 and 44 are peripherally notched, as seen at 97 in Figures 1 and 1a, to clear the cam followers 62.

In order to insure that the can bodies B shall project equidistantly from opposte sides of the body elevating chain reach 35b and thus be in readiness for transfer to the chute 65, two upwardly converging plates 98 (Figures 1a, 4 and 6) are provided between which the can bodies are elevated, said plates being so positioned that one or the other will act as a cam for longitudinally sliding any improperly positioned can body to properly position it. See the can body B directly under the turret 64 in Figure 4, which body projects excessively to the left and is being cammed toward the right to the required position. The plates 98 are provided with mounting brackets 99 which are adjustably secured at 100 to the angle bars 58 and 59.

To guard against possible lateral movement of any can body B from the receiver 34 as it is being slid by either of the plates 98, a guard plate 101 is provided, said guard plate being secured to brackets 102 which are mounted on one of the plates 98.

Operation

The can bodies B are continuously fed from the side seamer along the feedway 12 by the feed chain 16 and are thus presented successively to the magnetic body receivers 34 to be picked up by the latter, and elevated and turned. As each can body is approached by the receiver which is to receive it, it is held by the fixed magnet 29 against upward tilting and faulty engagement with the receiver under the influence of the magnet of this receiver. When this receiver fully straddles the magnetically held can body, however, the latter can be safely moved from the influence of the magnet 29 and this is done by the continued movement of the feed chain 16. During this further advance of the can body, the latter is positively guided toward the chain reach 35a by the cam 36 and said body thus becomes properly engaged with the receiver and is magnetically held therein. The receivers 34 elevate the can bodies B with their side seams S all presented away from the ascending reach 35b of the chain 35, as seen in Figure 4. The seams may therefore be readily subjected to heating means for drying the usual lacquer stripes applied to said seams by the side seaming machine, or other desired operations may be performed on said seams. As the can bodies B are being elevated, the cam followers 62 of the body receivers 34 are turned by the cam track 61 and the receivers are therefore turned until the can bodies are transverse to the chain reach 35b and at right angles thereto. As the can bodies complete their ascent, the strippers 63 smoothly strip them from the receivers 34 and finally the transfer turret 64 gently moves the stripped off bodies to the chute 65 and they roll down the latter to the next mechanism which is to operate upon them. As soon as the cam followers 34 leave the cam track 61, their springs 95 restore them to normal position in readiness for further can body reception.

During ascent of the can bodies B, if any of them project excessively in either direction from the chain reach 35b, this is corrected by one or the other of the upwardly converging plates 98 and danger of the can bodies jamming at the entrance of the chute 65 is thus obviated. Possible lateral movement of any can body from its respective receiver 34, during shifting of said body by one or the other of the plates 98, is prevented by the guard plate 101.

From the foregoing, it will be seen that novel provision has been disclosed for attaining the desired ends. However, attention is again invited to the possibility of making variations within the scope of the invention.

I claim:

1. In a can body transfer and turning means, a horizontal can body feedway, feed means for progressively feeding can bodies in uniformly spaced relation along said feedway with their axes aligned, a can body transfer chain, means mounting said chain and providing it with a body-receiving reach and a body-elevating reach, said body-receiving reach being disposed longitudinally of the delivery end portion of said can body feedway, means for so driving said chain that said body-receiving reach travels in substantially the same direction as the can bodies on said feedway and at the same speed as these bodies, can body receivers pivotally mounted on said chain and spaced apart in conformity with the can bodies on said feedway, said body receivers having can body attracting magnets, whereby the body receivers of the aforesaid body-receiving reach will successively remove can bodies from said feedway and the body receivers of said body-elevating reach will elevate the can bodies, actuating means for turning the body receivers of said body-elevating reach to dispose the ascending can bodies transversely of said body-elevating reach, means for successively stripping the transversely positioned can bodies from said body receivers, fixed magnetic means positioned to hold each can body horizontally positioned on said feedway as it is initially presented by said feed means to said body-receiving reach, thereby preventing tilting of the magnetically held can body under the influence of the magnet of the then approaching can body receiver while this receiver is moving to body-receiving position, and fixed cam means beyond said fixed magnetic means in position to guide each magnetically held can body away from said fixed magnetic means as this can body is further advanced by said feed means.

2. In a can body transfer means, a horizontal can body feedway, feed means for progressively feeding can bodies in uniformly spaced relation along said feedway with their axes aligned, a can body transfer chain, means mounting said chain and providing it with a body-receiving reach and a body-elevating reach, said body-receiving reach being disposed longitudinally of the delivery end portion of said can body feedway, means for so driving said chain that said body-receiving reach travels in substantially the same direction as the can bodies on said feedway and at the same speed as these bodies, can body receivers mounted on said chain and spaced apart in conformity with the can bodies on said feedway, said body receivers having can body attracting magnets, whereby the body receivers of the aforesaid body-receiving reach will successively remove can bodies from said feedway and the body receivers of said body-elevating reach will elevate the can bodies, means for successively stripping the elevated can bodies from said receivers, fixed magnetic means positioned to hold each can body horizontally positioned on said feedway as it is initially presented by said feed means to said body-receiving reach, thereby preventing tilting of the magnetically held can body under the influence of the magnet of the then approaching can body receiver while this receiver is moving to body-receiving position, and fixed cam means beyond said fixed magnetic means in position to guide each magnetically held can body away from said fixed magnetic means as this can body is further advanced by said feed means.

3. In a can body transfer means, a horizontal can body feedway, feed means for progressively feeding can bodies in uniformly spaced relation along said feedway with their axes aligned, a can body transfer chain, means mounting said chain and providing it with a body-receiving reach overlying the delivery end portion of said feedway, means for so driving said chain that said body-receiving reach travels in substantially the same direction as the can bodies on said feedway and at the same speed with these bodies, can body receivers mounted on said chain and spaced apart in conformity with the can bodies on said feedway, said can body receivers having can body attracting magnets to successively pick up the advanced can bodies from said feedway and connect them with said body receivers, fixed magnetic means positioned to hold each can body horizontally positioned on said feedway as it is initially presented by said feed means to said body-receiving reach, thereby preventing tilting of the magnetically held can body under the influence of the magnet of the then approaching can body receiver while this receiver is moving to body-receiving position, and fixed cam means beyond said fixed magnetic means in position to guide each magnetically held can body away from said fixed magnetic means as this can body is further advanced by said feed means.

4. A structure as specified in claim 3, in which said can body receiving reach diverges upwardly from said feedway in the direction in which the can bodies are fed along said feedway, said cam having an inclined upper edge substantially parallel with said reach.

5. A structure as specified in claim 3, in which said feed means includes a feed chain having upstanding lugs for pushing the can bodies along said feedway, said feedway having a supporting track for said drive chain, said track having a declined terminal portion positioned to downwardly guide said chain and free its lugs from the can bodies when these bodies have been advanced out of the influence of said fixed magnetic means.

6. A structure as specified in claim 3, in which said can body receiving reach diverges upwardly from said feedway in the direction in which the can bodies are fed along said feedway, said cam having an inclined upper edge substantially parallel with said reach, said feed means including a feed chain having upstanding lugs for pushing the can bodies along said feedway, said feedway having a supporting track for said drive chain, said track having a declined terminal portion positioned to downwardly guide said chain and free its lugs from the can bodies when these bodies have been advanced out of the influence of said fixed magnetic means.

7. In a can body elevating and turning means, a chain having a can body elevating reach, magnetic can body receivers pivotally mounted on said chain and normally positioned to receive can bodies extending longitudinally of the chain, means for turning said receivers to position the can bodies at right angles to the chain as said bodies are elevated, an elevated chute down which the elevated can bodies are to roll, stripper means positioned for stripping the elevated can bodies from said receivers, a transfer turret positioned to receive the stripped off can bodies and deliver them to said chute, and fixed vertically elongated plates mounted in positions to face the ends of the turned can bodies, said plates being disposed in upwardly converging relation and being adapted to shift any ascending can bodies which project excessively in one direction or the other from said body elevating reach into position in which they project equidistantly in opposite directions from said reach, thereby aligning can bodies with said chute and preventing jamming of can bodies against the entrance of said chute.

8. A structure as specified in claim 7: together with a fixed vertically elongated guard plate positioned to prevent any can body being shifted from laterally leaving its respective receiver during the shifting operation.

9. In a can body transfer means, a can body feedway, feed means for progressively feeding can bodies in uniformly spaced relation along said feedway with the axes of the cans being disposed generally longitudinally of said feedway, a can body conveyor, means mounting said conveyor with a portion of its travel being adjacent to said feedway at the delivery end portion of the feedway and immediately thereafter in diverging relation to said feedway, means driving said conveyor to move that portion of said conveyor which is momentarily adjacent said feedway in the same general direction and at the same speed as the can bodies on the feedway, said conveyor including can body receivers spaced apart in conformity with can bodies on said feedway, said can body receivers having can body attracting magnets to successively pick the advanced can bodies from said feedway and connect them with said body receivers, and fixed magnetic means positioned along said feedway to hold each can body generally axially of said feedway as it is initially presented by said feed means to said conveyor, thereby preventing tilting of the magnetically held can body under the influence of the magnet of the then approaching can body receiver while this receiver is moving to a body-receiving position.

10. In a can body transfer means, a can body feedway, feed means for progressively feeding can bodies in uniformly spaced relation along said feedway with the axes of the cans being disposed generally longitudinally of said feedway, a can body conveyor, means mounting said conveyor with a portion of its travel being adjacent to said feedway at the delivery end portion of the feedway and immediately thereafter in diverging relation to said feedway, means driving said conveyor to move that portion of said conveyor which is momentarily adjacent said feedway in the same general direction and at the same speed as the can bodies on the feedway, said conveyor including can body receivers spaced apart in conformity with can bodies on said feedway, said can body receivers having can body attracting magnets to successively pick the advanced can bodies from said feedway and connect them with said body receivers, fixed magnetic means positioned along said feedway to hold each can body generally axially of said feedway as it is initially presented by said feed means to said conveyor, thereby preventing tilting of the magnetically held can body under the influence of the magnet of the then approaching can body receiver while this receiver is moving to a body-receiving position, and fixed cam means beyond said fixed magnetic means in position to guide each magnetically held can body away from said fixed magnetic means as this can body is further advanced by said feed means.

References Cited in the file of this patent

UNITED STATES PATENTS

| | | |
|---|---|---|
| 1,474,448 | Scott | Nov. 20, 1923 |
| 2,335,239 | Gladfelter | Nov. 30, 1943 |
| 2,643,778 | Socke | June 30, 1953 |